Patented Dec. 31, 1940

2,227,317

UNITED STATES PATENT OFFICE 2,227,317

METHOD OF PREPARING DRIED VEGETABLE FOOD PRODUCTS

Clarence M. Nesbitt, Oneonta, N. Y., and David E. Warner, Storrs, Conn., assignors to Carromeal, Inc., West Brookfield, Mass., a corporation of Massachusetts No Drawing. Application December 27, 1938, Serial No. 247,945

3 Claims. (Cl. 99—204)

This invention relates to a concentrated vegetable food for human and other consumption produced from carrots rich in vitamins, and to a process for producing dried meal from carrots in their raw state so as to retain their natural mineral and vitamin content.

It is one of the objects of this invention to provide a concentrated raw vegetable food product from carrots which contains substantially all of the natural characteristics of the vegetable, that is, a product which is palatable, has good color, and retains beside the proximate principles, most of the minerals and vitamins.

It is a further object of the invention to provide a process of preserving vegetable products so as to conserve their vitamin content and other nutritive agents.

It is a further and more specific object of the invention to provide a new food product in the form of carrot meal obtained from raw carrots ground in their own juices and dried.

Preservation of vegetables in their natural state by storage or canning is difficult, expensive and wasteful and their transportation to distant points, because of their bulk and watery content, present problems of expense and waste. Moreover, to satisfy their nutritive requirements, it is necessary for animals including humans to consume large amounts of root crops, vegetables and tubers in the fresh or cooked state, but the preparation of these crops for food at the point of use sometimes requires considerable labor and time.

Processes of preservation involving blanching, cooking, drying at high temperatures or combining the vegetables with other agents, for example, sugar, vinegar, spices, etc., in the process of manufacture alter the vitamin and general nutritional content as well as the flavor of the vegetable products. The perservation of fruits and vegetables by drying is probably as old as civilized man, but the drying of such vegetables as carrots has never been considered satisfactory due to the loss of values and palatability in drying.

By this invention, it is proposed to provide a carrot meal produced from raw roots which have extracted therefrom only the watery content of the carrots. Carrots are rich in vitamins and contain protein, carbohydrates, minerals and other agencies. The dry matter which is contained in carrots is highly digestable and relatively high in its production of net energy per pound. Raw carrots may be considered as watery or diluted concentrates which, when processed as hereinafter described, retain their nutritive characteristics and vitamins.

In producing carrot meal according to this invention and in practicing the process, raw carrots, first washed, are finely cut or ground in a Mikro-Punerizer with rotary cutting knives or other suitable apparatus to reduce the carrots in their own juice to a pulpy mass of such consistency that the finely ground carrots may be dried easily. In the process of grinding the carrots, no other agencies are supplied and the resultant pulp product constitutes merely a reduction of the natural root vegetable to a pulpy mass preparatory to extracting its watery content.

The concentrated product obtained from the grinding operation is then dried by shaking or spraying the pulp into vacuum chambers or into enclosures in contact with previously dried and conditioned circulated air streams. It is important that this drying the conducted at from 21 degrees to 49 degrees centigrade over a period of from 25 to 70 minutes. Such temperature and time limits prevent heavy losses in vitamin content, color and palatability.

There are many ways in which the ground carrot pulp can be dried and we do not wish to be limited in the practice of the process to the use of any particular drying apparatus or method. It is preferred, however, to utilize the advantages of contacting the cream-like carrot pulp with a circulated air stream by shaking or atomizing the pulp into contact with the air stream at the indicated temperature range. For this purpose, there can be provided a chamber having an air inlet and outlet and a confined circulating passageway including an air conditioning space. The air in its passage to and from the drying chamber is contacted in the conditioning space with hygroscopic liquids to extract therefrom the moisture content of the air. Such air drying apparatus is old in the art and provides means whereby a maximum drying operation can be resorted to at low temperatures or at controlled temperatures, dependent on whether it is desired to heat the air stream in its circulation.

Another satisfactory method of drying within indicated temperature and time limits consists in spreading the carrot stock lightly upon the top of a reticulated conveyor belt traveling at variable speed through a steam heated tunnel drier equipped with steam pipes below the conveyor and with spaced exhaust fans, so arranged and spaced along the drier that a substantially straight line flow of heated air is caused to flow upwardly through the reticulated conveyor belt. In this method, independent temperature control means are employed to control the temperature in sections of the drier and the direct radiation of heat from the steam pipes causes moisture to be evaporated from the carrot stock, which, with the air flow through the variable speed conveyor and stock, results in a timed drying of the carrot stock as it passes through the drier.

The carrot meal product obtained by the methods described is one having uniform granular characteristics and constitutes the minute subdivision of the entire carrot content exclusive of the water removed therefrom in the drying process. The water content of carrots is from 83.1% to 91.1%, average 88.2%, and the concentrated product in the form of carrot meal obtained by the process is approximately one-tenth of the original bulk. There is, therefore, obtained a highly concentrated carrot meal which retains therein most of the valuable nutritive qualities of the carrot as well as excellent color and palatability.

While there have been produced heretofore dried vegetable products in cake form and in various forms, we are not aware that there has been heretofore produced, successfully, raw carrot meal obtained from the natural carrot without other treatment than grinding and drying as before described. Such a product has tremendous advantages for the purpose of mixing with other foods and for preserving the highly important food value of carrots for use as animal foods and for human consumption. The carrots in the meal form retaining all of the food values thereof, permit the consumption of the necessary vitamin content and other food agencies without requiring the use of the enormous bulk of raw vegetable which would be necessary to produce the same result.

While the invention has been particularly described with respect to the production of carrot meal, it will be apparent to those skilled in the art that the process herein described is also applicable in producing meals of other root products, vegetables and the like. It is highly important, however, in the practice of the process, that the vegetable products be utilized in their natural state without blanching or cooking or without processing in any manner to destroy their natural characteristics.

From the foregoing detailed description of the invention, it will be apparent that there is provided a new food product in the form of concentrated vegetable meal. While the invention has been described in connection with its preferred embodiment, it is to be understood that the words which have been used are words of description rather than of limitation, and that practice of the invention within the scope of the appended claims may be resorted to without departing from the true scope and spirit of the invention in all its aspects.

This application is a continuation-in-part of application Serial No. 133,744, filed March 20, 1937.

We claim:

1. The process of producing carrot meal from untreated raw carrots which comprises dividing all of the natural carrots to a fine pulp in their own juices under conditions whereby the fiber absorbs said juices, spreading said pulp to increase contact of the same with air, and circulating about said pulp heated air to dehydrate the pulp at a temperature of between 21° and 40° centigrade.

2. The process of producing carrot meal from untreated raw carrots which comprises dividing all of the natural carrots to a fine pulp in their own juices under conditions whereby the fiber absorbs said juices, mixing the pulp to secure uniformity thereof, spreading said pulp to increase contact of the same with air, and circulating about said pulp heated air to dehydrate the pulp at a temperature of between 21° and 49° centigrade.

3. The process of producing carrot meal from untreated raw carrots which comprises dividing all of the natural carrots to a fine pulp in their own juices under conditions whereby the fiber absorbs said juices, mixing the pulp to secure uniformity thereof, spreading said pulp to increase contact of the same with air, and for a period of between 25 and 70 minutes circulating about said pulp heated air to dehydrate the pulp at a temperature between 21° and 49° centigrade.

DAVID E. WARNER.
CLARENCE M. NESBITT.